(12) United States Patent
Liu et al.

(10) Patent No.: US 10,990,431 B2
(45) Date of Patent: Apr. 27, 2021

(54) VIRTUAL MACHINE HOT MIGRATION METHOD AND APPARATUS, AND SYSTEM

(71) Applicant: Tencent Technology (Shenzhen) Company Limited, Shenzhen (CN)

(72) Inventors: Hua Liu, Shenzhen (CN); Shuai Li, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 113 days.

(21) Appl. No.: 16/198,469

(22) Filed: Nov. 21, 2018

(65) Prior Publication Data

US 2019/0188024 A1 Jun. 20, 2019

Related U.S. Application Data

(63) Continuation of application No. PCT/CN2017/092563, filed on Jul. 12, 2017.

(30) Foreign Application Priority Data

Jul. 12, 2016 (CN) .......................... 201610545971.3

(51) Int. Cl.
 G06F 9/455 (2018.01)
(52) U.S. Cl.
 CPC .. G06F 9/45558 (2013.01); *G06F 2009/4557* (2013.01); *G06F 2009/45595* (2013.01)
(58) Field of Classification Search
 CPC ................................................ G06F 9/45558
 (Continued)

(56) References Cited

U.S. PATENT DOCUMENTS 8,826,292 B2 * 9/2014 Heim .................... G06F 9/5088
 718/1
2007/0130566 A1 6/2007 Van Rietschote et al.
(Continued)

FOREIGN PATENT DOCUMENTS

CN 104102543 A 10/2014
CN 104346211 A 2/2015
(Continued)

OTHER PUBLICATIONS

Domanal et al., Optimal Load Balancing in Cloud Computing, 2014, IEEE, pp. 1-4 (Year: 2014).*
(Continued)

*Primary Examiner* — John Q Chavis
(74) *Attorney, Agent, or Firm* — Morgan, Lewis & Bockius LLP

(57) ABSTRACT

This application discloses a virtual machine hot migration method performed by a virtual machine hot migration apparatus to a cloud computing system including a plurality of hosts, each host including a plurality of virtual machines. The apparatus obtains a load of each host, determines a host whose load exceeds a preset threshold as a source host, determines a to-be-hot-migrated target virtual machine in the source host; and controls the target virtual machine to be hot-migrated from the source host to a target host. According to the solutions provided in the embodiments of this application, when a load of a host is excessively high, a redundantly configured virtual machine on the host is hot-migrated to another host, thereby improving the resource utilization rate of the host when use by a user is ensured.

19 Claims, 5 Drawing Sheets

(58) Field of Classification Search
USPC .......................................................... 718/1
See application file for complete search history.

(56) References Cited

U.S. PATENT DOCUMENTS

| | | | | |
|---|---|---|---|---|
| 2011/0078303 | A1* | 3/2011 | Li | H04L 67/1012 709/224 |
| 2012/0117563 | A1* | 5/2012 | Chang | G06F 9/45558 718/1 |
| 2013/0174152 | A1* | 7/2013 | Yu | G01R 21/00 718/1 |
| 2013/0179884 | A1* | 7/2013 | Masood | G06F 9/455 718/1 |
| 2013/0218547 | A1* | 8/2013 | Ostermeyer | G06F 30/20 703/13 |
| 2013/0227571 | A1* | 8/2013 | Jayamohan | G06F 9/5044 718/1 |
| 2013/0318527 | A1* | 11/2013 | Tamura | G06F 9/45533 718/1 |
| 2014/0019966 | A1* | 1/2014 | Neuse | G06F 9/45533 718/1 |
| 2014/0082202 | A1* | 3/2014 | Zhao | G06F 9/45558 709/226 |
| 2014/0229949 | A1* | 8/2014 | Cai | G06F 9/5011 718/1 |
| 2015/0046589 | A1* | 2/2015 | Garza | G06F 9/5016 709/226 |
| 2015/0143372 | A1* | 5/2015 | Bercovici | G06F 9/4856 718/1 |
| 2015/0277956 | A1* | 10/2015 | Uchikawa | G06F 9/45558 718/1 |
| 2015/0281113 | A1* | 10/2015 | Siciliano | H04L 43/0817 709/226 |
| 2015/0339150 | A1* | 11/2015 | Yanagisawa | G06F 9/4401 718/1 |
| 2015/0378766 | A1* | 12/2015 | Beveridge | G06F 9/45558 718/1 |
| 2016/0004552 | A1* | 1/2016 | Innan | H04L 67/1008 718/1 |
| 2016/0094401 | A1* | 3/2016 | Anwar | G06F 9/45558 709/223 |
| 2016/0103699 | A1* | 4/2016 | Thakkar | G06F 9/45558 718/1 |

FOREIGN PATENT DOCUMENTS

| | | | | |
|---|---|---|---|---|
| CN | 105740074 | A | 7/2016 | |
| CN | 106227578 | A | 12/2016 | |
| KR | 10142861 | * | 6/2015 | G06F 9/50 |

OTHER PUBLICATIONS

Ni et al., Virtual Machine mapping policy based on Load Balancing . . . , 2011, IEEE, pp. 292-295 (Year: 2011).*
Bhatt et al., Enhance Load Balancing . . . in Cloud Computing, 2015, IEEE, pp. 72-76 (Year: 2015).*
Zhou et al., VMCTune: A Load Balancing Scheme . . . , 2010, IEEE, pp. 81-86 (Year: 2010).*
Shikha et al., Efficient utilization of Virtual Machines in Cloud Computing . . . , Sep. 4, 2015, IEEE, pp. 77-80 (Year: 2015).*
Moniruzzaman et al., An Experimental Study of Load Balancing . . . , 2014, IEEE, pp. 1-6 (Year: 2014).*
Forsman et al., Algorithms for automated live migration of virtual machines, Dec. 8, 2014, The journal of systems and Software (Year: 2014).*
Tencent Technology, ISRWO, PCT/CN2017/092563, Sep. 30, 2017, 7 pgs.
Tencent Technology, IPRP, PCT/CN2017/092563, Jan. 15, 2019, 6 pgs.

* cited by examiner

VIRTUAL MACHINE HOT MIGRATION METHOD AND APPARATUS, AND SYSTEM

PRIORITY CLAIM AND RELATED APPLICATION

This application is a continuation application of PCT/CN2017/092563, entitled "VIRTUAL MACHINE HOT MIGRATION METHOD AND DEVICE, AND SYSTEM" filed on Jul. 12, 2017, which claims priority to Chinese Patent Application No. 201610545971.3, filed with the State Intellectual Property Office of the People's Republic of China on Jul. 12, 2016, and entitled "VIRTUAL MACHINE HOT MIGRATION METHOD AND DEVICE, AND SYSTEM", all of which are incorporated herein by reference in their entirety.

FIELD OF THE TECHNOLOGY

This application relates to the field of cloud technologies, and specifically to a virtual machine hot migration method and apparatus, and a system.

BACKGROUND OF THE DISCLOSURE

A cloud computing system usually includes a control device and a large number of hosts. The control device may establish one or more virtual machines on a host by means of simulation by using virtual machine software. These virtual machines work like real computers.

A host may usually establish a plurality of virtual machines. For example, a host having 24 physical cores may establish 24 virtual machines, but not all the 24 virtual machines are used in real time. Therefore, hardware resources on the host are usually in an idle state, resulting in that the utilization rate of the hardware resources on the host is low.

SUMMARY

To resolve the problem that the utilization rate of hardware resources on a host is low, an embodiment of this application provides a virtual machine hot migration method: configuring, for each host, virtual machines whose number exceeds the number of cores of a processor on the host; and when a load of the host is excessively high, hot-migrating a virtual machine on the host to another host, thereby improving the resource utilization rate of the host when use by a user is ensured. Embodiments of this application further provide a corresponding apparatus and a corresponding system.

A first aspect of this application provides a virtual machine hot migration method, the method being applied to a cloud computing system, the cloud computing system including a plurality of hosts, each host including a plurality of virtual machines, and the method including:
obtaining a load of each host;
determining a host whose load exceeds a preset threshold as a source host;
determining a to-be-hot-migrated target virtual machine in the source host; and
controlling the target virtual machine to be hot-migrated from the source host to a target host.

A second aspect of this application provides a cloud computing system comprising a plurality of hosts, each host comprising a plurality of virtual machines, and a virtual machine hot migration apparatus having one or more processors, memory coupled to the one or more processors, and a plurality of programs that, when executed by the one or more processors, cause the apparatus to perform the aforementioned virtual machine hot migration method.

A third aspect of this application provides a non-transitory computer readable storage medium storing a plurality of programs in connection with a virtual machine hot migration apparatus for performing a virtual machine hot migration method to a cloud computing system comprising a plurality of hosts, each host comprising a plurality of virtual machines, wherein the plurality of programs, when executed by the one or more processors, cause the apparatus to perform the aforementioned virtual machine hot migration method.

According to the virtual machine hot migration method provided in the embodiments of this application: configuring, for each host, virtual machines whose number exceeds the number of cores of a processor on the host; and when a load of the host is excessively high, hot-migrating a virtual machine on the host to another host, the resource utilization rate of the host is improved when use by a user is ensured.

BRIEF DESCRIPTION OF THE DRAWINGS

To describe the technical solutions in the embodiments of this application more clearly, the following briefly introduces the accompanying drawings required for describing the embodiments. Apparently, the accompanying drawings in the following description show only some embodiments of this application, and a person skilled in the art may still derive other drawings from these accompanying drawings without creative efforts.

DESCRIPTION OF EMBODIMENTS

An embodiment of this application provides a virtual machine hot migration method: configuring, for each host, virtual machines whose number exceeds the number of cores of a processor on the host; and when a load of the host is excessively high, hot-migrating a virtual machine on the host to another host, thereby improving the resource utilization rate of the host when use by a user is ensured. Embodiments of this application further provide a corresponding apparatus and a corresponding system. Detailed descriptions are separately provided below.

The following clearly and completely describes the technical solutions in the embodiments of this application with reference to the accompanying drawings in the embodiments of this application. Apparently, the described embodiments are some of the embodiments of this application rather than all of the embodiments. All other embodiments obtained by a person skilled in the art based on the embodiments of this application without creative efforts shall fall within the protection scope of this application.

Figure 1:
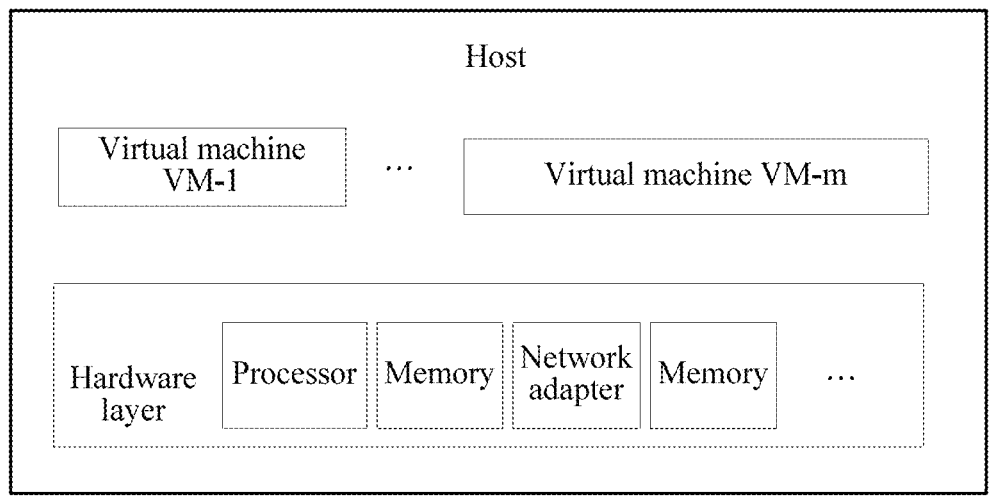
FIG. 1 is a schematic structural diagram of a host according to an embodiment of this application.

FIG. 1 is a schematic structural diagram of a host according to an embodiment of this application.

The host shown in FIG. 1 includes a virtual machine (VM) and a hardware layer. The hardware layer may provide hardware resources to each virtual machine.

Virtual Machine:

One or more virtual computers can be simulated on one host by using virtual machine software. These virtual machines work like real computers. An operating system and an application program can be installed on a virtual machine. The virtual machine can also access network resources. For an application program running in a virtual machine, the virtual machine works like a real computer. FIG. 1 shows m virtual machines VM-1 to VM-m, where m may be any integer greater than 1.

Hardware Layer:

A hardware platform for supporting a virtualized environment. The hardware layer may include a plurality of types of hardware, such as a processor (for example, a central processing unit (CPU)) and a memory, and may also include a high-speed or low-speed input/output (I/O) devices such as a network adapter and a memory, and other devices having specific processing functions, such as an input/output memory management unit (IOMMU), which can be used to perform conversion between a physical address of a virtual machine and a physical address of a host. One example of the memory is a magnetic disk (such as a hard disk).

Overselling: selling cores of a CPU of a host in multiples of the number of the cores. For example, a host has 24 CPU cores, and three times of the number of the CPU cores, that is, 72 cores in total are sold when a load of the host is not high. That is, the host can actually support only 24 virtual machines, but a cloud platform sells 72 virtual machines. Because each virtual machine is not used in real time, the cloud platform may package CPU cores in an idle state into virtual machines for sell.

Slight overselling: overselling cores of a CPU of a host by the number slightly greater than the number of the CPU cores (for example, a host has 24 CPU cores, and 6 CPU cores can be slightly oversold, that is, 30 cores in total are sold when a load of the host is not high).

In this embodiment of this application, slight overselling is that the number of oversold CPU cores is less than the number of CPU cores of a host, or alternatively, the number of the oversold CPU cores is less than 50% of the number of the CPU cores of the host, or alternatively, the number of the oversold CPU cores is less than 30% of the number of the CPU cores of the host, or alternatively, the number of the oversold CPU cores is less than 20% of the number of the CPU cores. Hot migration: also referred to as dynamic migration: migration of a virtual machine from one host to another host without affecting normal services of the virtual machine, where a user does not sense the entire migration process.

Load of a host: a utilization rate of a CPU of the host, a spare capacity of a memory, usage of a magnetic disk, and the like.

Figure 2:
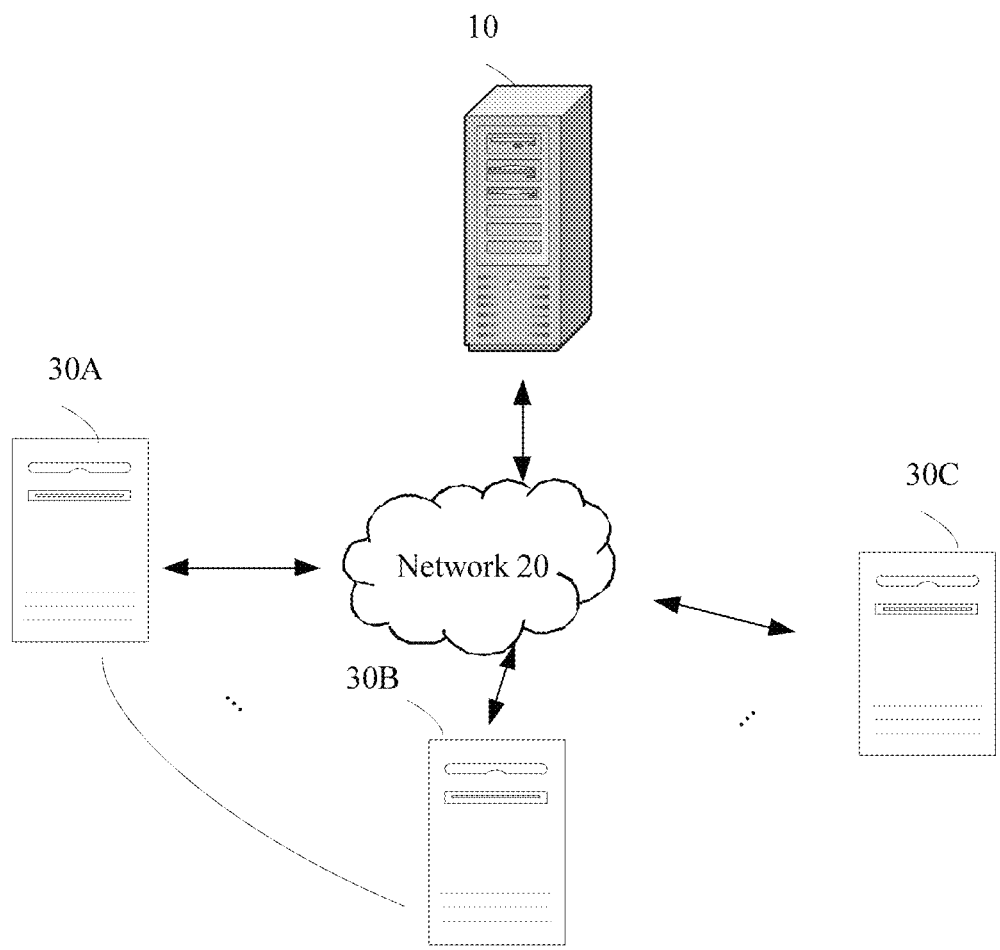
FIG. 2 is a schematic structural diagram of a cloud computing system according to an embodiment of this application.

FIG. 2 is a schematic structural diagram of a cloud computing system according to an embodiment of this application.

As shown in FIG. 2, the cloud computing system includes a control device 10, a network 20, and a plurality of hosts 30. The plurality of hosts 30 includes a host 30A, a host 30B, and a host 30C. The control device 10 is communicatively connected to the plurality of hosts 30 by using the network 20. Each host includes a plurality of virtual machines. The number of the virtual machines included in each host is greater than the number of cores of a processor on the host. That, virtual machines on each host are slightly oversold or oversold.

The control device 10 requests, in real time or periodically, each host for current load information of each host, for example, requests for current usage of a CPU. Alternatively, each host reports respective load information to the control device 10 in real time or periodically.

The control device 10 determines a host whose load exceeds a preset threshold as a source host according to the load information of each host. For example, if the preset threshold is that the usage of a CPU is 70%, the control device 10 may determine a host whose CPU usage exceeds 70% according to the load information of each host. For example, the control device 10 determines that the CPU usage of the host 30A in FIG. 2 exceeds 70%, and then the control device 10 determines the host 30A as a source host whose load exceeds the preset threshold.

After determining the source host, the control device 10 determines a target virtual machine from virtual machines that are currently in a running state of the source host (such as the host 30A). There may be one or more target virtual machines. A rule for determining the target virtual machine is that: the load of the source host can be reduced to below the preset threshold after hot migration of the target virtual machine.

After determining the target virtual machine, the control device 10 determines the target host according to the load information of each host and a load occupation of the target virtual machine. There may be one or more target hosts. A rule for determining the target host is that: the load of the target host does not exceed the preset threshold after the target host bears the target virtual machine. As shown in FIG. 2, the determined target host is the host 30B.

According to this embodiment of this application, when there is a plurality of target virtual machines, target hosts are determined in a manner that the number of the target hosts is minimum or the number of the target hosts is maximum.

For example, all hosts whose current loads do not exceed the preset threshold may be first determined. Then the hosts are ranked according to differences between the current loads and the preset threshold. A host with a largest difference is ranked on top. Starting from the host ranked on top, the maximum number of target virtual machines that the host can bear is determined when the load of the host does not exceed the preset threshold. After the maximum number of target virtual machines that the host ranked on top can bear is determined, for the remaining target virtual machines, the maximum number of target virtual machines that a host ranked on the second place can bear and the maximum numbers of target virtual machines that other hosts can bear are determined according to a same principle. In this manner (that is, the manner that the number of the target hosts is minimum), a minimum number of target hosts can be used to bear the target virtual machines.

For the manner that a maximum number of target hosts are used to bear the target virtual machines (that is, the manner that the number of the target hosts is maximum), assuming that there are 8 target virtual machines, and there are 6 hosts whose current loads do not exceed the preset threshold, on the first attempt, one target virtual machine may be allocated to each host. Assuming that the target virtual machines can be successfully allocated to 5 hosts, that is, the loads of the 5 hosts do not exceed the preset threshold after the target virtual machines are allocated to the 5 hosts, and if a target virtual machine is allocated to the remaining host, the load of the remaining host exceeds the preset threshold, the 5 hosts to which the target virtual machines can be successfully allocated are determined as target hosts. After one target virtual machine is allocated to each of the 5 hosts, the remaining target virtual machines may be continued to be allocated according to a same principle.

A person skilled in the art may understand that although it is described above that the target hosts are determined in a manner that the number of the target hosts is minimum or the number of the target hosts is maximum, this application is not limited thereto, and the target hosts may be determined in another manner.

The control device 10 controls the target virtual machine to be hot-migrated from the source host to a target host. That is, the target virtual machine is hot-migrated from the host 30A to the host 30B.

Figure 3:
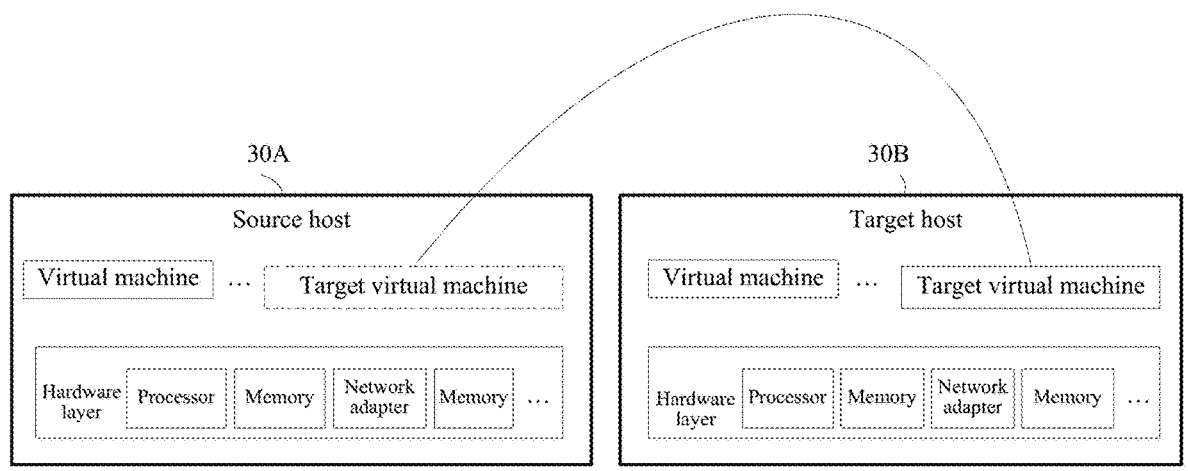
FIG. 3 is an exemplary schematic diagram of a virtual machine hot migration process according to an embodiment of this application.

Reference may be made to FIG. 3 for understanding of the virtual machine hot migration process. As shown in FIG. 3, the target virtual machine is hot-migrated from the host 30A to the host 30B. In some embodiments, the target virtual machine does not affect use by a user in the hot migration process.

The virtual machine hot migration process is actually a process of hot migration of data related to the virtual machine. When resources of the target virtual machine are all provided by hardware resources on the host, that the control device controls the target virtual machine to be hot-migrated from the source host to a target host may include:

controlling, by the control device, memory data and disk data corresponding to the target virtual machine to be hot-migrated to the target host.

Figure 4:
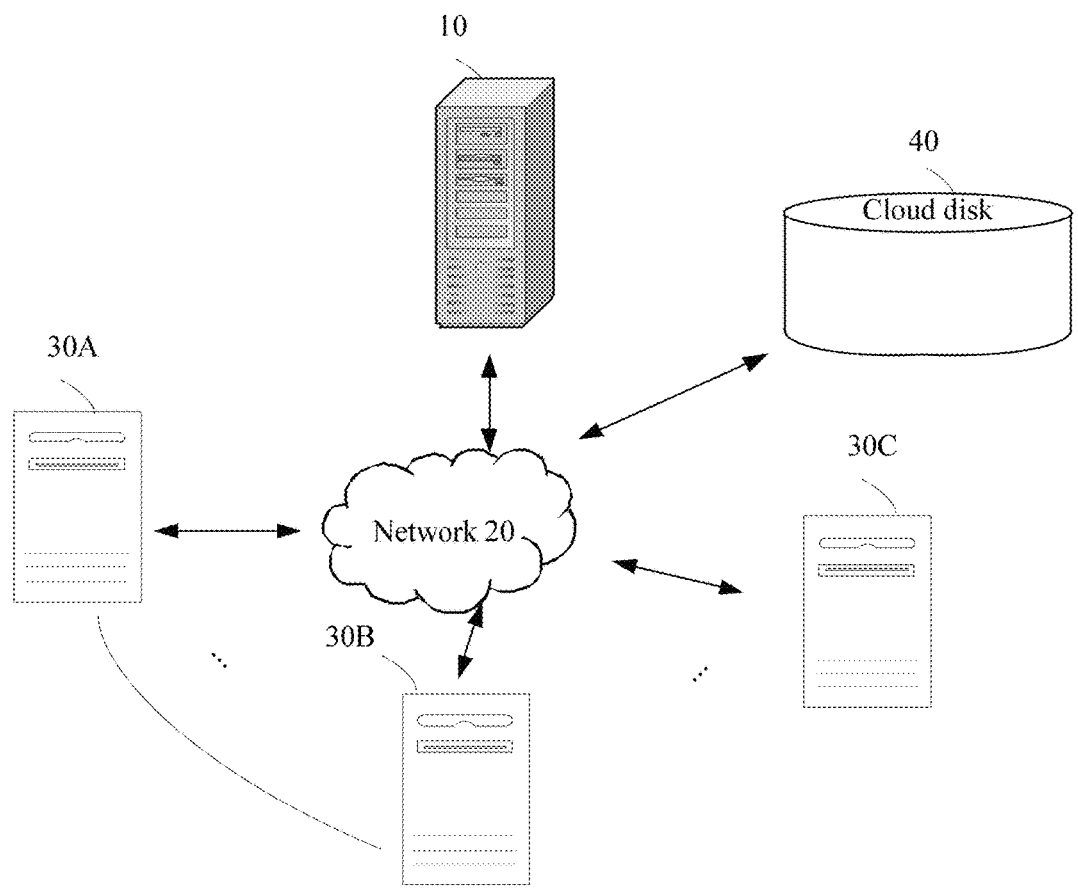
FIG. 4 is a schematic structural diagram of a cloud computing system according to another embodiment of this application.

Resources of the virtual machines described above are provided by hosts. Actually, resources of virtual machines may be separated. For example, core resources and memory resources of a processor may be provided by a host, and disk resources may be provided by a cloud disk in a cloud computing system. As shown in FIG. 4, in addition to the control device 10, the network 20, and the host 30, the cloud computing system further includes a cloud disk 40. When the cloud computing system further includes the cloud disk 40, the virtual machines on the hosts include local disk virtual machines and cloud disk virtual machines. Storage resources of the local disk virtual machines are provided by local disks on the hosts (such as memories and magnetic disks of the hosts). At least some of storage resources of the cloud disk virtual machines are provided by the cloud disk. For example, memories of the hosts provide some of storage resources, and other storage resources of the virtual machines are provided by the cloud disk. In this case, determining the target virtual machine is: determining, by the control device, the to-be-hot-migrated target virtual machine from the cloud disk virtual machines; and hot migration of the target virtual machine is: controlling, by the control device, the memory data corresponding to the target virtual machine to be hot-migrated to the target host.

Figure 5:
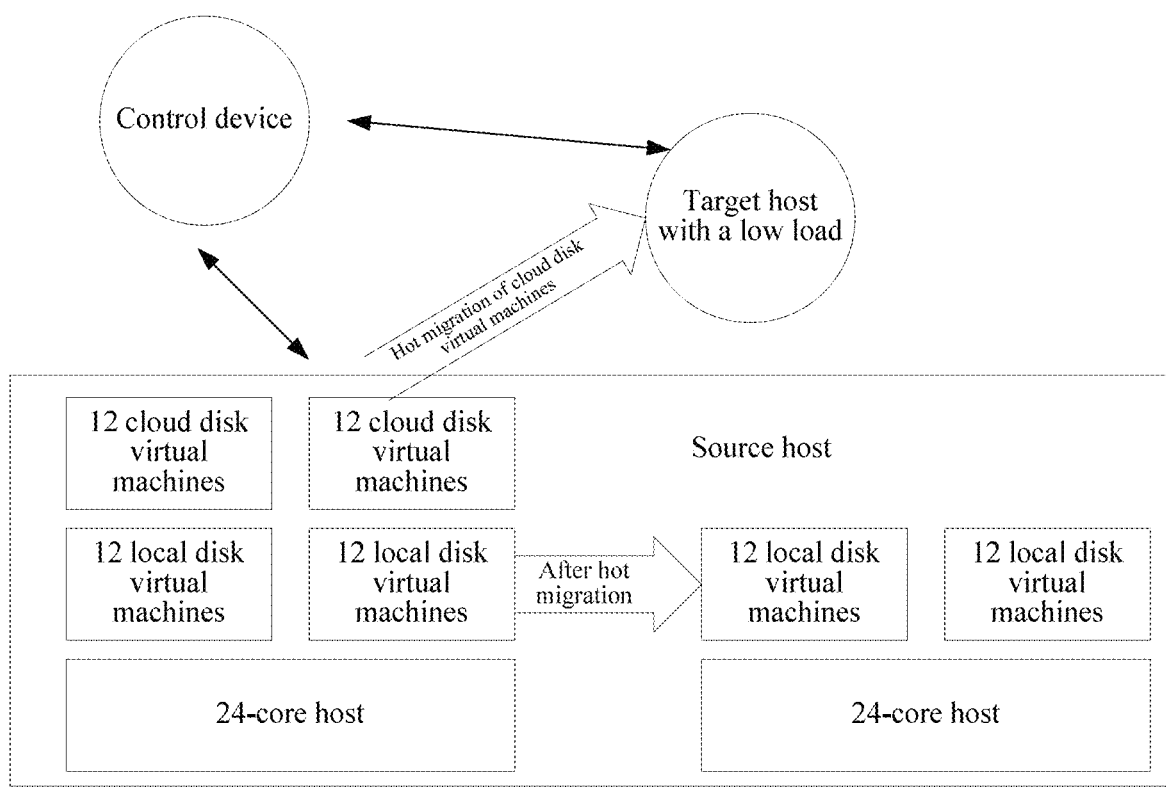
FIG. 5 is an exemplary schematic diagram of a virtual machine hot migration process according to another embodiment of this application.

Description of this application is continued below with reference to FIG. 5. FIG. 5 shows a source host according to an embodiment of this application. Local disk virtual machines and cloud disk virtual machines are established on the source host. The source host shown in FIG. 5 has 24 cores. According to a configuration factor, for example, when the configuration factor is 2, 24 local disk virtual machines and 24 cloud disk virtual machines may be established.

According to this embodiment of this application, a control device may obtain load information of each host in a cloud computing system in real time or periodically. When obtaining that the load of the source host in FIG. 5 is greater than a preset threshold, the control device migrates the cloud disk virtual machines from the source host to a target host after determining the target host with a low load. A person skilled in the art may understand that FIG. 5 is used merely for exemplary description. Actually, the migration quantity of the cloud disk virtual machines is determined according to the load condition of the source host. Contrary to FIG. 5, it is possible that not all the 24 cloud disk virtual machines need to be migrated. The cloud disk virtual machines may be migrated one by one, and then the load change condition of the source host is continuously obtained. If the load of the source host is reduced to below the preset threshold, migration of other cloud disk virtual machines does not need to be continued. If the load of the source host is still high, migration is continued, until the load of the source host is reduced to below the preset threshold. Certain, the solution of hot migration is not limited to one-by-one migration. Alternatively, the migration quantity may be determined at one time, and then the determined quantity of cloud disk virtual machines are migrated at one time. In some embodiments, if the load of the source host still fails to be reduced to below the preset threshold after all the cloud disk virtual machines are migrated, the local disk virtual machines may be migrated, until the load of the source host is reduced to below the preset threshold. The cloud computing system provided above configures, for each host, virtual machines whose number exceeds the number of local cores of the host, and when a load of the host is excessively high, hot-migrates a redundantly configured virtual machine on the host to another host, thereby improving the resource utilization rate of the host when use by a user is ensured.

The solution of virtual machine hot migration provided in this embodiment of this application is applicable to cases of slight overselling and overselling of virtual machines.

The foregoing describes a virtual machine hot migration process in combination with a cloud computing system. A virtual machine hot migration method in this embodiment of this application is described below with reference to FIG. 6.

Figure 6:
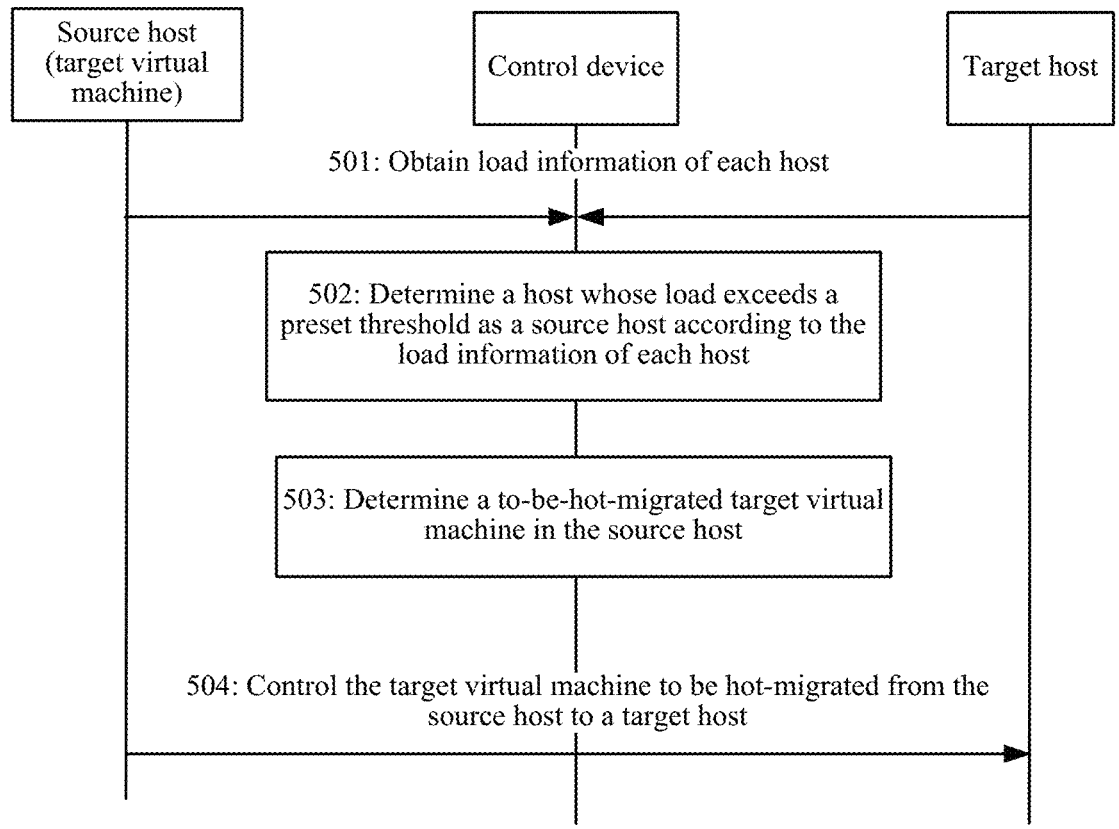
FIG. 6 is a schematic diagram of a virtual machine hot migration method according to an embodiment of this application.

As shown in FIG. 6, the virtual machine hot migration method provided in this embodiment of this application, for example, may be performed by a control device of a cloud computing system. In addition to the control device, the cloud computing system may further include a plurality of hosts. The method includes:

501: A control device obtains load information of each host, where the load information of the host includes a load of the host.

Each host of the cloud computing system includes a plurality of virtual machines. The number of the virtual machines included in each host is greater than the number of cores of a processor on the host.

502: The control device determines a host whose load exceeds a preset threshold as a source host according to the load information of each host.

The value of the preset threshold is adjustable, and may be adjusted according to needs.

503: The control device determines a to-be-hot-migrated target virtual machine in the source host.

504: The control device controls the target virtual machine to be hot-migrated from the source host to a target host.

According to the virtual machine hot migration method provided in this embodiment of this application: configuring, for each host, virtual machines whose number exceeds the number of local cores of the host; and when a load of the host is excessively high, hot-migrating a redundantly configured virtual machine on the host to another host, the resource utilization rate of the host is improved when use by a user is ensured.

In some embodiments, that the control device determines a to-be-hot-migrated target virtual machine in the source host may include:

determining, by the control device, the target virtual machine according to a load occupation of each virtual machine in the source host, where a rule for determining the target virtual machine is that: the load of the source host is reduced to below the preset threshold after the target virtual machine is hot-migrated.

In some embodiments, before the control device controls the target virtual machine to be hot-migrated from the source host to the target host, the method may further include:

determining, by the control device, the target host according to the load information (such as the load) of each host and the load occupation of the target virtual machine, where a rule for determining the target host is that: the load of the target host does not exceed the preset threshold after the target host bears the target virtual machine.

In some embodiments, that the control device controls the target virtual machine to be hot-migrated from the source host to a target host may include:

controlling, by the control device, memory data and disk data corresponding to the target virtual machine to be hot-migrated to the target host.

In some embodiments, the cloud computing system further includes a cloud disk. The virtual machines on the hosts include local disk virtual machines and cloud disk virtual machines. Storage resources of the local disk virtual machines are provided by local disks on the hosts. Some of storage resources of the cloud disk virtual machines are provided by memories of the hosts, and other storage resources are provided by the cloud disk. That the control device determines a to-be-hot-migrated target virtual machine in the source host may include:

determining, by the control device, the to-be-hot-migrated target virtual machine from the cloud disk virtual machines.

That the control device controls the target virtual machine to be hot-migrated from the source host to a target host may include:

controlling, by the control device, the memory data corresponding to the target virtual machine to be hot-migrated to the target host.

Reference may be made to some of descriptions of FIG. 1 to FIG. 5 for understanding of the virtual machine hot migration method provided in this embodiment. Details are not described herein again.

The virtual machine hot migration process is described above. A virtual machine hot migration apparatus in an embodiment of this application is described below with reference to FIG. 7. One example of the virtual machine hot migration apparatus is a control device.

Figure 7:
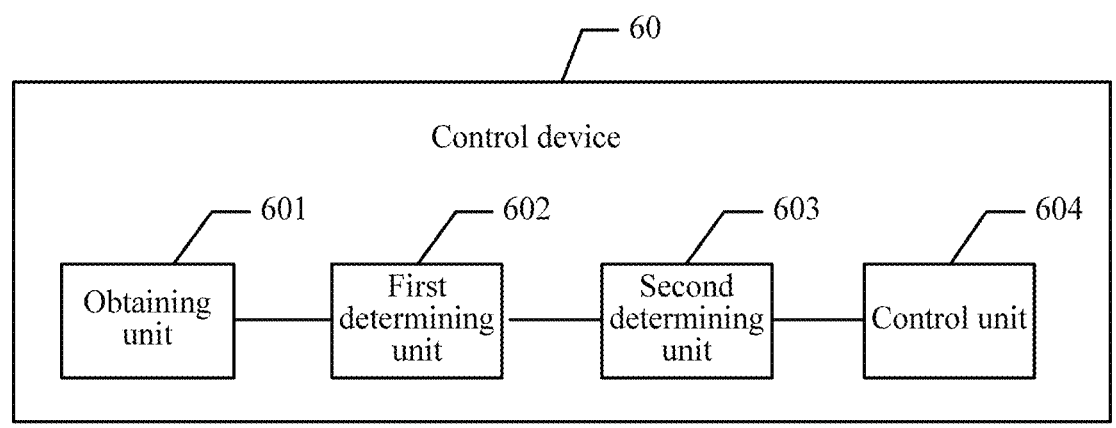
FIG. 7 is a schematic diagram of a control device according to an embodiment of this application.

Referring to FIG. 7, the control device 60 provided in this embodiment of this application is applied to a cloud computing system. The cloud computing system further includes a plurality of hosts, each host including a plurality of virtual machines. The number of the virtual machines included in each host is greater than the number of cores of a processor on the host. The control device 60 may include:

an obtaining unit 601, configured to obtain load information of each host, where the load information of the host includes a load of the host;

a first determining unit 602, configured to determine, according to the load information, obtained by the obtaining unit 601, of each host, a host whose load exceeds a preset threshold as a source host;

a second determining unit 603, configured to determine a to-be-hot-migrated target virtual machine in the source host determined by the first determining unit 602; and a control unit 604, configured to control the target virtual machine determined by the second determining unit 603 to be hot-migrated from the source host to a target host.

In the control device provided in this embodiment of this application, the obtaining unit 601 obtains the load information of each host; the first determining unit 602 determines, according to the load information, obtained by the obtaining unit 601, of each host, the host whose load exceeds the preset threshold as the source host; the second determining unit 603 determines the to-be-hot-migrated target virtual machine in the source host determined by the first determining unit 602; and the control unit 604 controls the target virtual machine determined by the second determining unit 603 to be hot-migrated from the source host to the target host. The control device provided in this embodiment of this application may configure, for each host, virtual machines whose number exceeds the number of local cores of the host, and when a load of the host is excessively high, hot-migrate a redundantly configured virtual machine on the host to another host, thereby improving the resource utilization rate of the host when use by a user is ensured.

In some embodiments, the second determining unit 603 is configured to determine the target virtual machine according to a load occupation of each virtual machine in the source host. A rule for determining the target virtual machine is that: the load of the source host is reduced to below the preset threshold after the target virtual machine is hot-migrated.

In some embodiments, the second determining unit 603 is further configured to determine the target host according to the load information (such as the load) of each host and the load occupation of the target virtual machine. A rule for determining the target host is that: the load of the target host does not exceed the preset threshold after the target host bears the target virtual machine.

In some embodiments, the control unit 604 is configured to control memory data and disk data corresponding to the target virtual machine to be hot-migrated to the target host.

In some embodiments, the cloud computing system further includes a cloud disk. The virtual machines on the hosts include local disk virtual machines and cloud disk virtual machines. Storage resources of the local disk virtual machines are provided by local disks on the hosts. Some of storage resources of the cloud disk virtual machines are provided by memories of the hosts, and other storage resources are provided by the cloud disk. The second determining unit 603 is configured to determine the to-be-hot-migrated target virtual machine from the cloud disk virtual machines.

The control unit 604 is configured to control the memory data corresponding to the target virtual machine to be hot-migrated to the target host.

Reference may be made to some of corresponding descriptions of FIG. 1 to FIG. 5 for understanding of the control device provided by the embodiment corresponding to FIG. 7 or a corresponding optional embodiment. Details are not described herein again.

Figure 8:
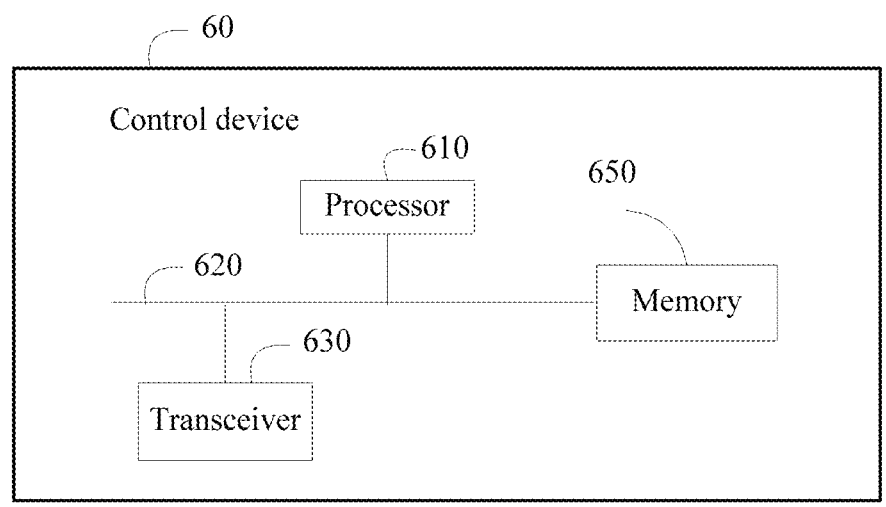
FIG. 8 is a schematic structural diagram of a control device according to an embodiment of this application.

FIG. 8 is a schematic structural diagram of a virtual machine hot migration apparatus according to this application by using a control device 60 as an example. The control device 60 is applied to a cloud computing system. The cloud computing system further includes a plurality of hosts, each host including a plurality of virtual machines. The number of the virtual machines included in each host is greater than the number of cores of a processor on the host. The control device 60 includes a processor 610, a memory 650, and an input/output device 630. The memory 650 may include a read-only memory (ROM) and a random access memory (RAM), and provides operating instructions and data to the processor 610. A part of the memory 650 may further include a non-volatile RAM (NVRAM).

In some implementations, the memory 650 stores the following elements: an executable module, a data structure, a subset thereof, or an extension set thereof.

In this embodiment of this application, by calling operating instructions (the operating instructions may be stored in an operating system) stored in the memory 650, load information of each host is obtained, where the load information of the host includes a load of the host;

a host whose load exceeds a preset threshold is determined as a source host according to the load information of each host;

a to-be-hot-migrated target virtual machine in the source host is determined; and the target virtual machine is controlled to be hot-migrated from the source host to a target host.

The control device provided in this embodiment of this application may configure, for each host, virtual machines whose number exceeds the number of local cores of the host, and when a load of the host is excessively high, hot-migrate a redundantly configured virtual machine on the host to another host, thereby improving the resource utilization rate of the host when use by a user is ensured.

The processor 610 controls operation of the control device 60. The processor 610 may also be referred to as a central processing unit (CPU). The memory 650 may include a ROM and a RAM, and provides instructions and data to the processor 610. A part of the memory 650 may further include a non-volatile RAM (NVRAM). In the specific application, all components of the control device 60 are coupled together by using a bus system 620, where the bus system 620 includes not only a data bus, but also a power supply bus, a control bus, a state signal bus, and the like. However, for clear description, in the figure, all buses are marked as the bus system 620.

The methods disclosed in the foregoing embodiments of this application may be applied to the processor 610, or may be implemented by the processor 610. The processor 610 may be an integrated circuit chip, having a capability of processing a signal. In an implementation process, steps of the foregoing methods may be completed by using an integrated logical circuit of hardware in the processor 610 or an instruction in a form of software. The processor 610 may be a general purpose processor, a digital signal processor (DSP), an application-specific integrated circuit (ASIC), a field programmable gate array (FPGA) or another programmable logic device, a discrete gate or a transistor logic device, or a discrete hardware assembly. The methods, steps, and logical block diagrams disclosed in the embodiments of this application may be implemented or performed. The general purpose processor may be a microprocessor, any regular processor, or the like. In combination with the methods disclosed in the embodiments of this application, steps may be represented directly as being implemented by a hardware decoding processor, or implemented by a combination of hardware and software modules in a decoding processor. A software module may be located in a mature storage medium in the art, such as a RAM, a flash memory, a ROM, a programmable ROM, an electrical erasable programmable memory, a register, or the like. The storage medium is located in the memory 650, and the processor 610 reads information in the memory 650 and completes the steps of the foregoing methods in combination with hardware thereof.

In some embodiments, the processor 610 is configured to: determine the target virtual machine according to a load occupation of each virtual machine in the source host. A rule for determining the target virtual machine is that: the load of the source host is reduced to below the preset threshold after the target virtual machine is hot-migrated.

In some embodiments, the processor 610 is further configured to determine the target host according to the load information (such as the load) of each host and the load occupation of the target virtual machine. A rule for determining the target host is that: the load of the target host does not exceed the preset threshold after the target host bears the target virtual machine.

In some embodiments, the processor 610 is configured to control memory data and disk data corresponding to the target virtual machine to be hot-migrated to the target host.

In some embodiments, the processor 610 is configured to: when the cloud computing system further includes a cloud disk, the virtual machines on the hosts include local disk virtual machines and cloud disk virtual machines, storage resources of the local disk virtual machines are provided by local disks on the hosts, some of storage resources of the cloud disk virtual machines are provided by memories of the hosts, and other storage resources of the cloud disk virtual machines are provided by the cloud disk, determine the to-be-hot-migrated target virtual machine from the cloud disk virtual machines; and control the memory data corresponding to the target virtual machine to be hot-migrated to the target host.

Reference may be made to some of corresponding descriptions of FIG. 1 to FIG. 5 for understanding of the control device described in FIG. 8. Details are not described herein again.

A person of ordinary skill in the art may understand that all or some of the steps of the methods in the embodiments may be implemented by a program instructing relevant hardware. The program may be stored in a non-transitory computer readable storage medium. The storage medium may include: a ROM, a RAM, a magnetic disk, an optical disc, or the like.

The virtual machine hot migration method and device, and the system provided in the embodiments of this application are described in detail above. Principles and implementations of this application are illustrated herein with reference to specific examples. The descriptions of the foregoing embodiments are used merely to help understand the method and core thought of this application. Moreover, a person of ordinary skill in the art may make variations in specific implementations and the application scope based on thoughts of this application. In conclusion, content of this specification should not be considered as a limitation to this application.

What is claimed is:

1. A virtual machine hot migration method, the method being applied to a cloud computing system, the cloud computing system comprising a plurality of hosts, each host comprising a plurality of virtual machines, and the method comprising:
obtaining a load of each of the plurality of hosts;
in accordance with the load of each of the plurality of hosts,
determining, among the plurality of hosts, a host whose load exceeds a preset threshold as a source host, wherein the source host is configured with more virtual machines than a number of cores of a processor on the source host;
determining, among the plurality of hosts, a target host whose load does not exceed the preset threshold after the target host bears a to-be-hot-migrated target virtual machine;
determining a to-be-hot-migrated target virtual machine in the source host, wherein the load of the source host is reduced to be below the preset threshold after hot migration of the to-be-hot-migrated target virtual machine to the target host; and
controlling memory data and disk data corresponding to the target virtual machine to be hot-migrated from the source host to the target host, the target host providing core resources and memory resources of a processor and a cloud disk in the cloud computing system providing disk resources, wherein:
hot-migrating of the target virtual machine comprises hot migrating data related to the target virtual machine; and
hot-migrating comprises a process for migrating a virtual machine from the source host to the target host without affecting normal services of the virtual machine to a remote user of the virtual machine.

2. The method according to claim 1, wherein the determining a to-be-hot-migrated target virtual machine in the source host comprises:
determining the target virtual machine according to a load occupation of each virtual machine in the source host, so that the load of the source host is reduced to below the preset threshold after the target virtual machine is hot-migrated.

3. The method according to claim 2, wherein before the controlling the target virtual machine to be hot-migrated from the source host to a target host, the method further comprises:
determining the target host according to the load of each host and the load occupation of the target virtual machine, so that the load of the target host does not exceed the preset threshold after the target host bears the target virtual machine.

4. The method according to claim 1, wherein the cloud computing system further comprises a cloud disk, the virtual machines on the hosts comprise cloud disk virtual machines, some of storage resources of the cloud disk virtual machines are provided by memories of the hosts, and other storage resources are provided by the cloud disk;
the determining a to-be-hot-migrated target virtual machine in the source host further comprises:
determining the to-be-hot-migrated target virtual machine from the cloud disk virtual machines; and
the controlling the target virtual machine to be hot-migrated from the source host to a target host comprises:
controlling the memory data corresponding to the target virtual machine to be hot-migrated to the target host.

5. The method according to claim 4, wherein the virtual machines on the hosts further comprise local disk virtual machines, and storage resources of the local disk virtual machines are provided by the memories and magnetic disks on the hosts.

6. The method according to claim 1, wherein the number of the virtual machines comprised in each host is greater than the number of cores on the host.

7. The method according to claim 1, wherein the cloud computing system further comprises a control device connected to each host, and the control device performs the method.

8. A cloud computing system comprising a plurality of hosts, each host comprising a plurality of virtual machines, and a virtual machine hot migration apparatus having one or more processors, memory coupled to the one or more processors, and a plurality of programs that, when executed by the one or more processors, cause the apparatus to perform the following operations:
obtaining a load of each of the plurality of hosts;
in accordance with the load of each of the plurality of hosts,
determining, among the plurality of hosts, a host whose load exceeds a preset threshold as a source host, wherein the source host is configured with more virtual machines than a number of cores of a processor on the source host;
determining, among the plurality of hosts, a target host whose load does not exceed the preset threshold after the target host bears a to-be-hot-migrated target virtual machine;
determining a to-be-hot-migrated target virtual machine in the source host, wherein the load of the source host is reduced to be below the preset threshold after hot migration of the to-be-hot-migrated target virtual machine to the target host; and
controlling memory data and disk data corresponding to the target virtual machine to be hot-migrated from the source host to the target host, the target host providing core resources and memory resources of a processor and a cloud disk in the cloud computing system providing disk resources, wherein:
hot-migrating of the target virtual machine comprises hot migrating data related to the target virtual machine; and
hot-migrating comprises a process for migrating a virtual machine from the source host to the target host without affecting normal services of the virtual machine to a remote user of the virtual machine.

9. The cloud computing system according to claim 8, wherein the determining a to-be-hot-migrated target virtual machine in the source host comprises:
determining the target virtual machine according to a load occupation of each virtual machine in the source host, so that the load of the source host is reduced to below the preset threshold after the target virtual machine is hot-migrated.

10. The cloud computing system according to claim 9, wherein before the controlling the target virtual machine to be hot-migrated from the source host to a target host, the operations further comprise:

determining the target host according to the load of each host and the load occupation of the target virtual machine, so that the load of the target host does not exceed the preset threshold after the target host bears the target virtual machine.

11. The cloud computing system according to claim 8, wherein the controlling the target virtual machine to be hot-migrated from the source host to a target host comprises:
controlling memory data and disk data corresponding to the target virtual machine to be hot-migrated to the target host.

12. The cloud computing system according to claim 8, wherein the cloud computing system further comprises a cloud disk, the virtual machines on the hosts comprise cloud disk virtual machines, some of storage resources of the cloud disk virtual machines are provided by memories of the hosts, and other storage resources are provided by the cloud disk;
the determining a to-be-hot-migrated target virtual machine in the source host further comprises:
determining the to-be-hot-migrated target virtual machine from the cloud disk virtual machines; and
the controlling the target virtual machine to be hot-migrated from the source host to a target host comprises:
controlling the memory data corresponding to the target virtual machine to be hot-migrated to the target host.

13. The cloud computing system according to claim 12, wherein the virtual machines on the hosts further comprise local disk virtual machines, and storage resources of the local disk virtual machines are provided by the memories and magnetic disks on the hosts.

14. The cloud computing system according to claim 8, wherein the number of the virtual machines comprised in each host is greater than the number of cores on the host.

15. The cloud computing system according to claim 8, wherein the cloud computing system further comprises a control device connected to each host, and the control device performs the method.

16. A non-transitory computer readable storage medium storing a plurality of programs in connection with a virtual machine hot migration apparatus for performing a virtual machine hot migration method to a cloud computing system comprising a plurality of hosts, each host comprising a plurality of virtual machines, wherein the plurality of programs, when executed by the one or more processors, cause the apparatus to perform the following operations:
obtaining a load of each of the plurality of hosts;
in accordance with the load of each of the plurality of hosts,
determining, among the plurality of hosts, a host whose load exceeds a preset threshold as a source host, wherein the source host is configured with more virtual machines than a number of cores of a processor on the source host;
determining, among the plurality of hosts, a target host whose load does not exceed the preset threshold after the target host bears a to-be-hot-migrated target virtual machine;
determining a to-be-hot-migrated target virtual machine in the source host, wherein the load of the source host is reduced to be below the preset threshold after hot migration of the to-be-hot-migrated target virtual machine to the target host; and
controlling memory data and disk data corresponding to the target virtual machine to be hot-migrated from the source host to the target host, the target host providing core resources and memory resources of a processor and a cloud disk in the cloud computing system providing disk resources, wherein:
hot-migrating of the target virtual machine comprises hot migrating data related to the target virtual machine; and
hot-migrating comprises a process for migrating a virtual machine from the source host to the target host without affecting normal services of the virtual machine to a remote user of the virtual machine.

17. The non-transitory computer readable storage medium according to claim 16, wherein the determining a to-be-hot-migrated target virtual machine in the source host comprises:
determining the target virtual machine according to a load occupation of each virtual machine in the source host, so that the load of the source host is reduced to below the preset threshold after the target virtual machine is hot-migrated.

18. The non-transitory computer readable storage medium according to claim 17, wherein before the controlling the target virtual machine to be hot-migrated from the source host to a target host, the operations further comprise:
determining the target host according to the load of each host and the load occupation of the target virtual machine, so that the load of the target host does not exceed the preset threshold after the target host bears the target virtual machine.

19. The non-transitory computer readable storage medium according to claim 16, wherein the controlling the target virtual machine to be hot-migrated from the source host to a target host comprises:
controlling memory data and disk data corresponding to the target virtual machine to be hot-migrated to the target host.

* * * * *